US011781565B2

(12) United States Patent
Fedorikhin et al.

(10) Patent No.: US 11,781,565 B2
(45) Date of Patent: Oct. 10, 2023

(54) INTEGRATED E-MACHINE CONTROLLER FOR TURBOMACHINE HAVING FASTENER ARRANGEMENT FOR ELECTRONICS COMPONENTS

(71) Applicant: Garrett Transportation I Inc., Torrance, CA (US)

(72) Inventors: Valeriy Fedorikhin, Redondo Beach, CA (US); Adam Robinson, Los Angeles, CA (US)

(73) Assignee: GARRETT TRANSPORTATION I INC., Torrance, CA (US)

( * ) Notice: Subject to any disclaimer, the term of this patent is extended or adjusted under 35 U.S.C. 154(b) by 39 days.

(21) Appl. No.: 17/304,878

(22) Filed: Jun. 28, 2021

(65) Prior Publication Data

US 2022/0412374 A1 Dec. 29, 2022

(51) Int. Cl.
| | | |
|---|---|---|
| *F04D 29/62* | (2006.01) | |
| *F04D 17/10* | (2006.01) | |
| *F04D 25/06* | (2006.01) | |
| *F04D 29/42* | (2006.01) | |

(52) U.S. Cl.
CPC .......... *F04D 29/624* (2013.01); *F04D 17/10* (2013.01); *F04D 25/06* (2013.01); *F04D 29/4206* (2013.01)

(58) Field of Classification Search
CPC . F04D 29/5833; F04D 13/0686; H02K 11/05; H02K 11/30; H02K 11/33; H02K 11/38; H02K 11/40; H02K 13/14; H02K 2203/03; H02K 2211/03; H02K 15/00; H02K 15/0062
See application file for complete search history.

(56) References Cited

U.S. PATENT DOCUMENTS

| | | | | |
|---|---|---|---|---|
| 6,109,930 | A * | 8/2000 | Koschmeder | H05K 3/325 439/74 |
| 6,695,634 | B1 * | 2/2004 | Boggs | H05K 3/368 439/74 |
| 7,352,077 | B2 * | 4/2008 | Shibui | F01D 15/10 290/52 |
| 10,462,937 | B1 * | 10/2019 | Louco | H05K 1/183 |
| 2014/0265661 | A1 | 9/2014 | Chamberlin et al. | |
| 2015/0349604 | A1 | 12/2015 | Wallace | |
| 2016/0097396 | A1 * | 4/2016 | Yamagata | F04D 25/068 417/45 |

FOREIGN PATENT DOCUMENTS

| | | | | |
|---|---|---|---|---|
| DE | 10045597 | C1 * | 1/2002 | ............ F04D 13/06 |
| EP | 1260714 | A1 * | 11/2002 | ......... F04D 13/0686 |
| EP | 2305981 | B1 | 4/2013 | |
| EP | 3136570 | A1 | 3/2017 | |

* cited by examiner

Primary Examiner — Philip E Stimpert
(74) Attorney, Agent, or Firm — LORENZ & KOPF, LLP

(57) ABSTRACT

A fluid compressor device includes an integrated controller of an e-machine. The integrated controller has an arcuate support structure that extends about the axis of rotation of a rotating group. The support structure has a seat that is disposed at a radial area of the arcuate support structure. The integrated controller has an electronics component supported on the seat. The integrated controller includes a retainer clip that is resiliently flexible between a neutral position and a flexed position. The retainer clip is fixed to the support structure and in the flexed position to retain the electronics component on the seat.

18 Claims, 5 Drawing Sheets

INTEGRATED E-MACHINE CONTROLLER FOR TURBOMACHINE HAVING FASTENER ARRANGEMENT FOR ELECTRONICS COMPONENTS

TECHNICAL FIELD

The present disclosure generally relates to a turbomachine and, more particularly, relates to an integrated e-machine controller for a turbomachine having a fastener arrangement for retaining electronics components.

BACKGROUND

Some turbomachines include an e-machine, such as an electric motor or generator. More specifically, some turbochargers, superchargers, or other fluid compression devices can include an electric motor that is operably coupled to the same shaft that supports a compressor wheel, turbine wheel, etc. The electric motor may drivingly rotate the shaft, for example, to assist a turbine stage of the device. In some embodiments, the e-machine may be configured as an electric generator, which converts mechanical energy of the rotating shaft into electric energy.

These devices may also include a controller that, for example, controls operation of the e-machine. More specifically, the control system may control the torque, speed, or other operating parameters of the e-machine and, as such, control operating parameters of the rotating group of the turbomachine.

However, conventional controllers of such fluid compression devices suffer from various deficiencies. These controllers can be heavy and/or bulky. Furthermore, the electronics included in the controller may generate significant heat, which can negatively affect operations. Similarly, the operating environment of the device can subject the electronics to high temperatures, vibrational loads, or other conditions that negatively affect operations. In addition, manufacture and assembly of conventional control systems can be difficult, time consuming, or otherwise inefficient.

Thus, it is desirable to provide an e-machine controller for a fluid compression device that is retained in a robust manner. It is also desirable to provide a compact controller that operates at high efficiency. It is also desirable to provide a controller that provides a highly effective cooling effect. It is also desirable to provide improvements that increase manufacturing efficiency for such a controller. Other desirable features and characteristics of the present disclosure will become apparent from the subsequent detailed description and the appended claims, taken in conjunction with the accompanying drawings and this background discussion.

BRIEF SUMMARY

In one embodiment, a fluid compressor device is disclosed that includes a housing and a rotating group supported for rotation within the housing about an axis. The rotating group includes a compressor wheel. The fluid compressor device also includes an e-machine that is operably coupled to the rotating group and configured as at least one of a motor and a generator. Additionally, the fluid compressor device includes an integrated controller of the e-machine and that is supported by the housing. The integrated controller has an arcuate support structure that extends about the axis. The support structure has a seat that is disposed at a radial area of the arcuate support structure. The integrated controller has an electronics component supported on the seat. The integrated controller includes a retainer clip that is resiliently flexible between a neutral position and a flexed position. The retainer clip is fixed to the support structure and in the flexed position to retain the electronics component on the seat.

In another embodiment, a method of manufacturing a fluid compressor device is disclosed. The method includes supporting a rotating group within a housing about an axis. The rotating group includes a compressor wheel. The method also includes operably coupling an e-machine to the rotating group. The e-machine is configured as at least one of a motor and a generator. Furthermore, the method includes supporting an integrated controller of the e-machine on the housing, including extending an arcuate support structure about the axis. The support structure has a seat disposed at a radial area of the arcuate support structure. Furthermore, the method includes retaining an electronics component on the seat with a retainer clip, including fixing the retainer clip to the support structure and resiliently flexing the retainer clip to retain the electronics component on the seat.

Moreover, a turbocharger is disclosed. The turbocharger includes a housing and a rotating group supported for rotation within the housing about an axis. The rotating group includes a compressor wheel and a turbine wheel. The turbocharger also includes an electric motor that is operably coupled to the rotating group to drive rotation of the rotating group about the axis. The turbocharger additionally includes an integrated controller of the electric motor that is supported by the housing. The integrated controller has an arcuate coolant core that extends about the axis. The coolant core has an outer radial area that faces radially away from the axis and that includes a first seat and a second seat that are spaced apart circumferentially. The integrated controller has a first electronics component and a second electronics component. The integrated controller includes a resiliently flexible retainer clip having a first end, a second end, and an intermediate portion that is disposed between the first end and the second end. The intermediate portion is fixed to the coolant core. The first electronics component is retained and disposed radially between the coolant core and the first end with the first end resiliently flexed, and the second electronics component is retained and disposed radially between the coolant core and the second end with the second end resiliently flexed.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
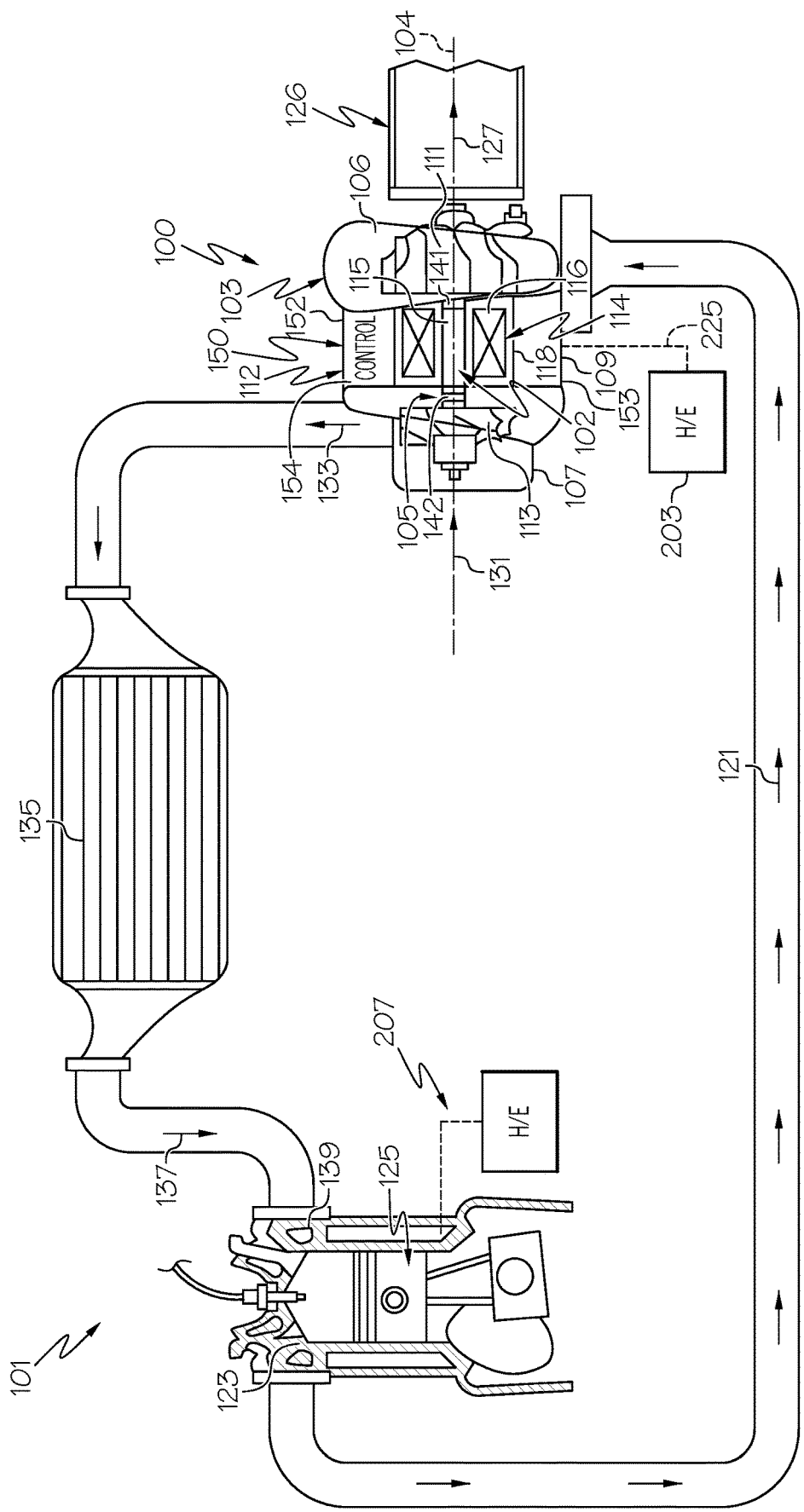
FIG. 1 is a schematic illustration of an engine system with a fluid compressor device that includes an integrated controller according to example embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved controller for a turbomachine. The controller may be integrated into, packaged among, and compactly arranged on the turbomachine for improved performance and for reducing the size and profile of the turbomachine. In some embodiments, the integrated controller may wrap, extend, span circumferentially, or otherwise be arranged about an axis of rotation defined by the rotating group of the turbomachine. The housing of the controller may be generally arcuate in some embodiments, and internal components (e.g., support structures, electronics components, and/or coolant system features) may be shaped, configured, assembled, and arranged about the axis to reduce the size of the turbomachine.

In addition, the turbomachine may be a compressor device, and the integrated controller may be arranged proximate the compressor section (e.g., proximate a compressor housing). Furthermore, the turbomachine may include a turbine section, and the compressor device may be disposed proximate thereto (e.g., proximate the turbine housing). The controller may, in some embodiments, be arranged compactly between a compressor section and a turbine section of the turbomachine. Furthermore, in some embodiments, the integrated controller may be wrapped or disposed about an e-machine (e.g., a motor) of the turbomachine. The controller may be configured for controlling the e-machine and their close proximity may increase operating efficiency. The controller may, thus, be closely integrated and packaged within the turbomachine. The components may be securely and robustly supported within the integrated controller.

The integrated controller may also include a number of electronics components for controlling operations of the e-machine. These electronics components may include one or more transistors, circuit components, switch components, MOSFET transistors, etc. The controller of the present disclosure may include an improved fastener arrangement for retaining and supporting the electronics components on a support structure.

In some embodiments, the support structure may be configured as a heat sink, a cooled component, etc. The support structure may also be cooled by a fluid coolant that flows through a coolant circuit. The fastener arrangement may attach one or more electronics components to the support structure (e.g., a coolant core of the controller) and may include a number of features that retain the electronics component(s) thereon.

The fastener arrangement of the present disclosure may include features that facilitate manufacture and assembly of the integrated controller. For example, the fastener arrangement may secure and robustly retain the electronics components on a coolant core of the controller. There may be a relatively low part count and assembly time may be reduced. Furthermore, the fastener arrangement may be utilized in a high-volume manufacturing environment repeatedly and with precision. Furthermore, the fastener arrangement may ensure that the electronics components are subjected to acceptable retaining loads without damaging the components and in a repeatable fashion.

In some embodiments, the fastener arrangement may include at least one spring biasing element. For example, there may be included at least one resiliently flexible retainer clip. The clip may resiliently flex from a neutral position to a biased position during installation of the electronics component, and the clip may remain in this biased position to retain the electronics component. A mounting portion of the clip may affix to the support structure (e.g., to the coolant core), and a biasing portion of the clip may extend from the mounting portion for engaging and biasing the electronics component toward a mounting seat of the support structure (e.g., to the coolant core). In some embodiments, there may be a first biasing portion that engages and retains a first electronics component, and there may be a second biasing portion that engages and retains a second, neighboring component. This arrangement may be provided on an outer radial portion of the support structure. Accordingly, the electronics components may be closely arranged, and the fastener arrangement may retain these components robustly. The fastener arrangement may also include an enlarged engagement surfaces for distributing retaining forces across the electronics components, thereby protecting from damage. Additionally, the resilient clip may be configured to deflect a predetermined amount during installation such that the biasing force applied to the electronics component is predetermined and controlled. The resilient clips may also be useful in high-volume manufacturing systems because the electronics components may be installed carefully, securely, and in a repeatable manner.

Moreover, the fastener arrangement may be useful for packaging the electronics components compactly within the turbomachine without sacrificing thermal performance, mechanical strength and robustness, etc. Accordingly, the electronics components may be tightly packed, and the turbomachine may operate at extreme conditions, yet the integrated controller may remain robustly supported and may maintain operation at acceptable temperatures.

FIG. 1 is a schematic view of an example turbomachine, such as a turbocharger 100 that is incorporated within an engine system 101 and that includes one or more features of the present disclosure. It will be appreciated that the turbocharger 100 could be another turbomachine (e.g., a supercharger, a turbine-less compressor device, etc.) in additional embodiments of the present disclosure. Furthermore, the turbomachine of the present disclosure may be incorporated into a number of systems other than an engine system without departing from the scope of the present disclosure. For example, the turbomachine of the present disclosure may be incorporated within a fuel cell system for compressing air that is fed to a fuel cell stack, or the turbomachine may be incorporated within another system without departing from the scope of the present disclosure.

Generally, the turbocharger 100 may include a housing 103 and a rotating group 102, which is supported within the housing 103 for rotation about an axis 104 by a bearing system 105. The bearing system 105 may be of any suitable type, such as a roller-element bearing or an air bearing system.

As shown in the illustrated embodiment, the housing 103 may include a turbine housing 106, a compressor housing 107, and an intermediate housing 109. The intermediate housing 109 may be disposed axially between the turbine and compressor housings 106, 107.

Additionally, the rotating group 102 may include a turbine wheel 111, a compressor wheel 113, and a shaft 115. The turbine wheel 111 is located substantially within the turbine housing 106. The compressor wheel 113 is located substantially within the compressor housing 107. The shaft 115 extends along the axis of rotation 104, through the intermediate housing 109, to connect the turbine wheel 111 to the compressor wheel 113. Accordingly, the turbine wheel 111 and the compressor wheel 113 may rotate together as a unit about the axis 104.

The turbine housing 106 and the turbine wheel 111 cooperate to form a turbine stage (i.e., turbine section) configured to circumferentially receive a high-pressure and high-temperature exhaust gas stream 121 from an engine, specifically, from an exhaust manifold 123 of an internal combustion engine 125. The turbine wheel 111 and, thus, the other components of the rotating group 102 are driven in rotation around the axis 104 by the high-pressure and high-temperature exhaust gas stream 121, which becomes a lower-pressure and lower-temperature exhaust gas stream 127 that is released into a downstream exhaust pipe 126.

The compressor housing 107 and compressor wheel 113 cooperate to form a compressor stage (i.e., compressor section). The compressor wheel 113, being driven in rotation by the exhaust-gas driven turbine wheel 111, is configured to compress received input air 131 (e.g., ambient air, or already-pressurized air from a previous-stage in a multi-stage compressor) into a pressurized airstream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream is characterized by an increased temperature, over that of the input air 131.

The pressurized airstream 133 may be channeled through an air cooler 135 (i.e., intercooler), such as a convectively cooled charge air cooler. The air cooler 135 may be configured to dissipate heat from the pressurized airstream 133, increasing its density. The resulting cooled and pressurized output air stream 137 is channeled into an intake manifold 139 of the internal combustion engine 125, or alternatively, into a subsequent-stage, in-series compressor.

Furthermore, the turbocharger 100 may include an e-machine stage 112. The e-machine stage 112 may be cooperatively defined by the intermediate housing 109 and by an e-machine 114 housed therein. The shaft 115 may extend through the e-machine stage 112, and the e-machine 114 may be operably coupled thereto. The e-machine 114 may be an electric motor, an electric generator, or a combination of both. Thus, the e-machine 114 may be configured as a motor to convert electrical energy to mechanical (rotational) energy of the shaft 115 for driving the rotating group 102. Furthermore, the e-machine 114 may be configured as a generator to convert mechanical energy of the shaft 115 to electrical energy that is stored in a battery, etc. As stated, the e-machine 114 may be configured as a combination motor/generator, and the e-machine 114 may be configured to switch functionality between motor and generator modes in some embodiments as well.

For purposes of discussion, the e-machine 114 will be referred to as a motor 116. The motor 116 may include a rotor member (e.g., a plurality of permanent magnets) that are supported on the shaft 115 so as to rotate with the rotating group 102. The motor 116 may also include a stator member (e.g., a plurality of windings, etc.) that is housed and supported within the intermediate housing 109. In some embodiments, the motor 116 may be disposed axially between a first bearing 141 and a second bearing 142 of the bearing system 105. Also, the motor 116 may be housed by a motor housing 118 of the intermediate housing 109. The motor housing 118 may be a thin-walled or shell-like housing that encases the stator member of the motor 116. The motor housing 118 may also encircle the axis 104, and the shaft 115 may extend therethrough.

Furthermore, the turbocharger 100 may include an integrated controller 150. The integrated controller 150 may generally include a controller housing 152 and a number of internal components 154 (e.g., circuitry, electronic components, cooling components, support structures, etc.) housed within the controller housing 152. The integrated controller 150 may control various functions. For example, the integrated controller 150 may control the motor 116 to thereby control certain parameters (torque, angular speed, START/STOP, acceleration, etc.) of the rotating group 102. The integrated controller 150 may also be in communication with a battery, an electrical control unit (ECU), or other components of the respective vehicle in some embodiments. More specifically, the integrated controller 150 may receive DC power from a vehicle battery, and the integrated controller 150 may convert the power to AC power for controlling the motor 116. In additional embodiments wherein the e-machine 114 is a combination motor/generator, the integrated controller 150 may operate to switch the e-machine 114 between its motor and generator functionality.

Figure 3:
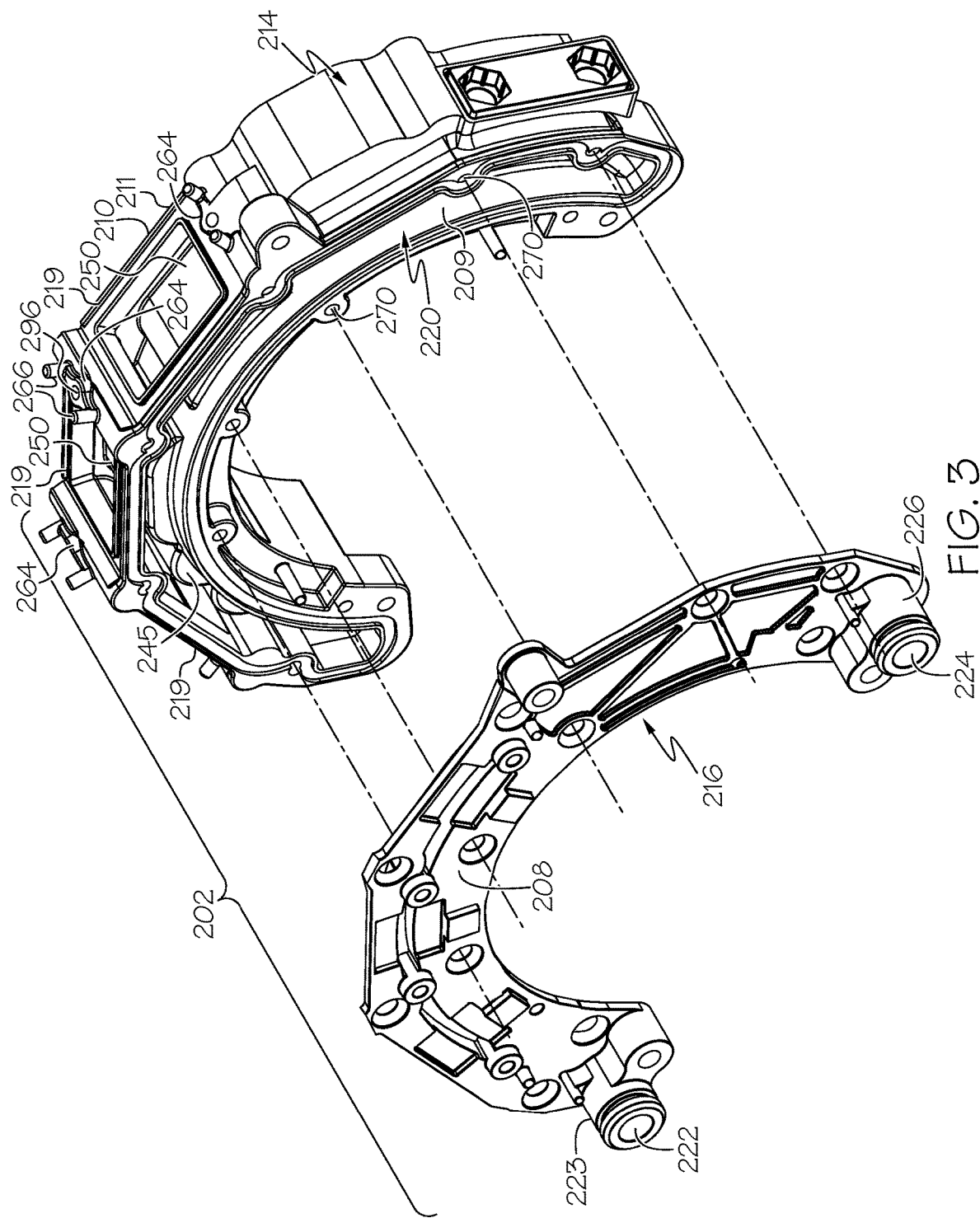
FIG. 3 is an exploded isometric view of a coolant core of the integrated controller of FIG. 2 from a first perspective.
Figure 4:
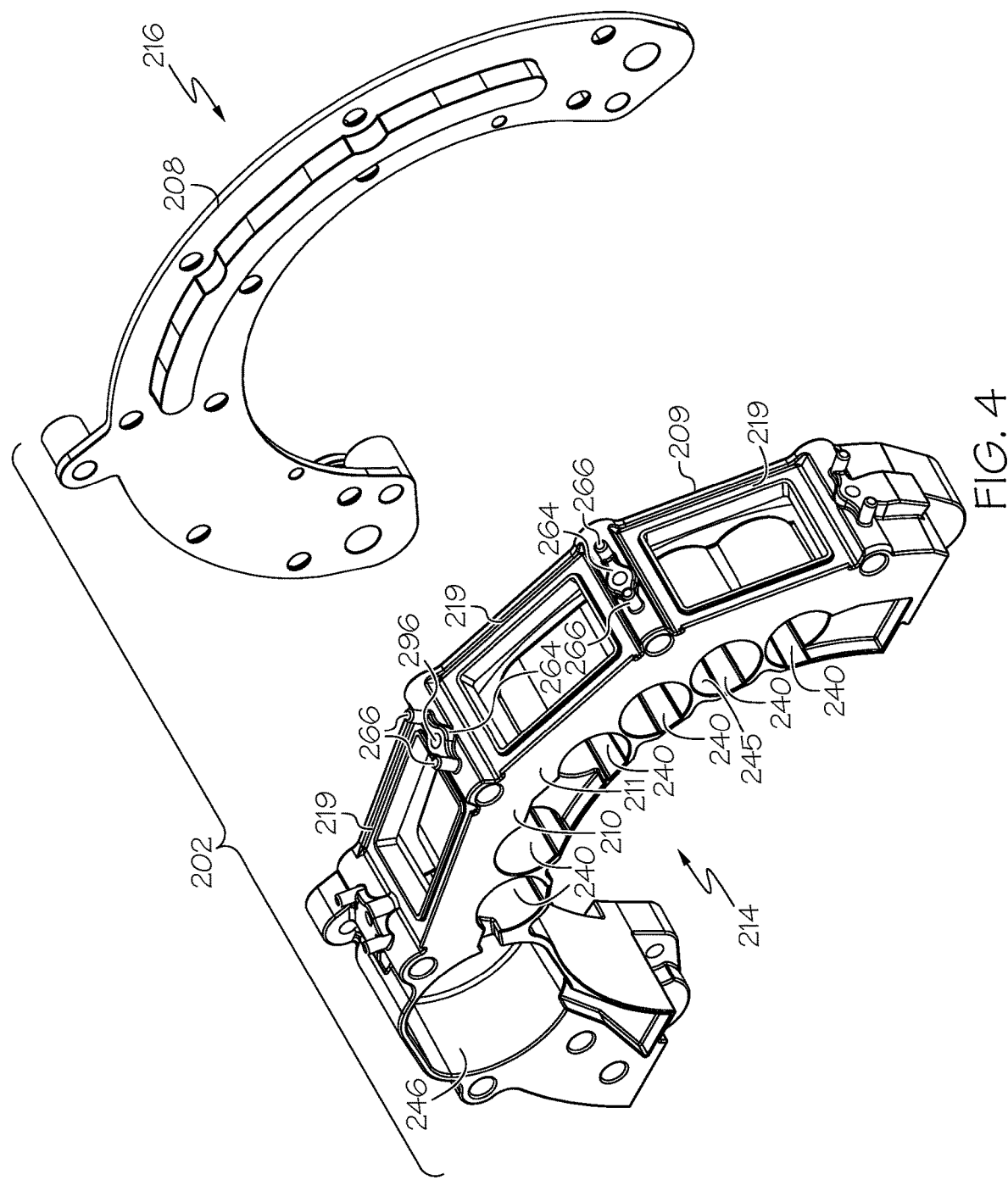
FIG. 4 is an exploded isometric view of a coolant core of the integrated controller of FIG. 2 from a second perspective.

In some embodiments, the integrated controller 150 may be disposed axially between the compressor stage and the turbine stage of the turbocharger 100 with respect to the axis 104. Thus, as illustrated, the integrated controller 150 may be disposed and may be integrated proximate the motor 116. For example, as shown in the illustrated embodiment, the integrated controller 150 may be disposed on and may be arranged radially over the motor housing 118. More specifically, the integrated controller 150 may extend and wrap about the axis 104 to cover over the motor 116 such that the motor 116 is disposed radially between the shaft 115 and the integrated controller 150. The integrated controller 150 may also extend about the axis 104 in the circumferential direction and may cover over, overlap, and wrap over at least part of the motor housing 118. In some embodiments, the integrated controller 150 may wrap between approximately forty-five degrees (45°) and three-hundred-sixty-five degrees (365°) about the axis 104. For example, as shown in FIGS. 2-4, the controller 150 may wrap approximately one-hundred-eighty degrees (180°) about the axis 104.

Figure 2:
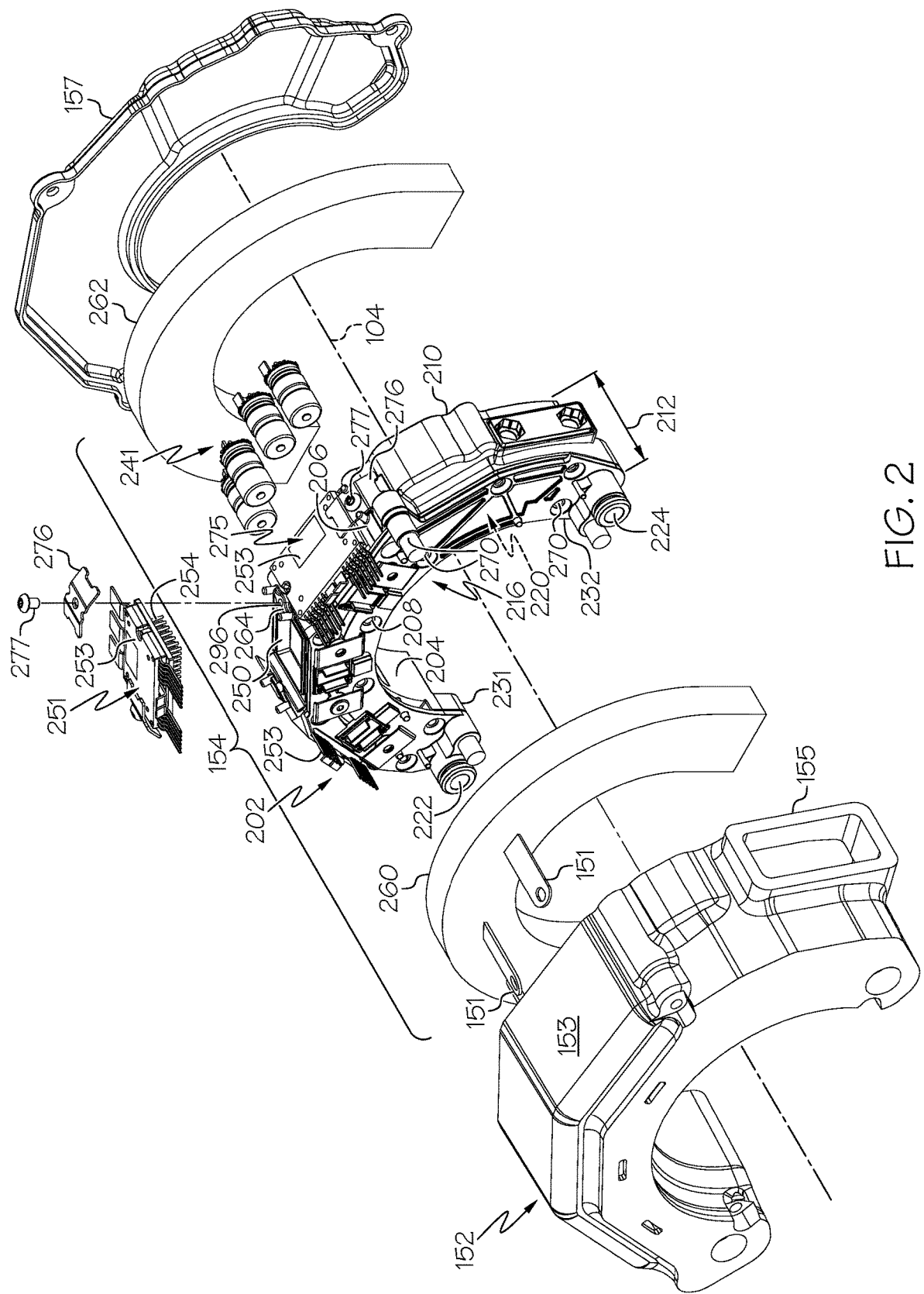
FIG. 2 is an exploded isometric view of the integrated controller according to example embodiments of the present disclosure.

The controller housing 152 is shown schematically in FIG. 2. As illustrated, the housing 152 may generally be arcuate so as to extend about the axis 104 and to conform generally to the rounded profile of the turbocharger 100. The housing 152 may also be an outer shell-like member that is hollow and that encapsulates the internal components 154. In some embodiments, the housing 152 may be cooperatively defined by an outer housing body 155 and a cover 157 that covers over an open end of the outer housing body 155. Electrical connectors 151 may extend through the housing 152 for electrically connecting the internal components 154 to external systems. Furthermore, there may be openings for fluid couplings (e.g., couplings for fluid coolant). In some embodiments, there may be electrical connectors and fluid couplings that extend along a common direction (e.g., a single direction along the axis 104) to facilitate assembly of the turbocharger 100. Additionally, the controller housing 152 may define part of the exterior of the turbocharger 100. An outer surface 153 of the controller housing 152 may extend about the axis 104 and may face radially away from the axis 104. The outer surface 153 may be at least partly smoothly contoured about the axis 102 as shown, or the outer surface 153 may include one or more flat panels that are arranged tangentially with respect to the axis 104 (e.g., a series such flat panels that are arranged about the axis 104). The outer surface 153 may be disposed generally at the same radius as the neighboring compressor housing 107 and/or turbine housing 106 as shown in FIG. 1. Accordingly, the overall size and profile of the turbocharger 100, including the controller 150, may be very compact.

The internal components 154 may be housed within the controller housing 152. Also, at least some of the internal components 154 may extend arcuately, wrap about, and/or may be arranged about the axis 104 as will be discussed. Furthermore, as will be discussed, the internal components 154 may be stacked axially along the axis 104 in close proximity such that the controller 150 is very compact. As such, the integrated controller 150 may be compactly arranged and integrated with the turbine stage, the compressor stage, and/or other components of the turbocharger 100. Also, internal components 154 of the controller 150 may be in close proximity to the motor 116 to provide certain advantages. For example, because of this close proximity, there may be reduced noise, less inductance, etc. for more efficient control of the motor 116.

Furthermore, the controller 150 may include a number of components 154 that provide robust support. The controller 150 may also include components that provide efficient cooling. Thus, the turbocharger 100 may operate at extreme conditions due to elevated temperatures, mechanical loads, electrical loads, etc. Regardless, the controller 150 may be tightly integrated into the turbocharger 100 without compromising performance.

Referring now to FIG. 2, the internal components 154 of the integrated controller 150 will be discussed in greater detail according to various embodiments. Generally, the integrated controller 150 may include a coolant core 202. The coolant core 202 is shown in isolation in FIGS. 3 and 4 for clarity. As will be discussed, the coolant core 202 may be configured for supporting a number of electronics components, fastening structures, and other parts of the integrated controller 150. As such the coolant core 202 may be referred to as a "support structure." The coolant core 202 may also define one or more coolant passages through which a fluid coolant flows. As such, the coolant core 202 may receive a flow of a coolant therethrough for cooling the integrated controller 150.

The coolant core 202 may be elongate but curved and arcuate in shape and may extend in a tangential and/or circumferential direction about the axis 104. In other words, the coolant core 202 may wrap at least partially about the axis 104 to fit about the motor 116 of the turbocharger 100. Accordingly, the coolant core 202 may define an inner radial area 204 that faces the axis 104 and an outer radial area 206 that faces away from the axis 104. Moreover, the coolant core 202 may include a first axial end 208 and a second axial end 210, which face away in opposite axial directions. The first axial end 208 may face the compressor section of the turbocharger 100 in some embodiments and the second axial end 210 may face the turbine section in some embodiments. The coolant core 202 may also define an axial width 212, which may be defined parallel to the axis 104 between the first and second axial ends 208, 210. Additionally, the coolant core 202 may be semi-circular and elongate so as to extend circumferentially between a first angular end 231 and a second angular end 232, which are spaced apart angularly about the axis (e.g., approximately one-hundred-eighty degrees (180°) apart).

As shown in FIGS. 3 and 4, the coolant core 202 may be cooperatively defined by a plurality of parts, such as a reservoir body 214 and a cover plate 216. Both the reservoir body 214 and the cover plate 216 may be made from strong and lightweight material with relatively high thermal conductivity characteristics (e.g., a metal, such as aluminum). In some embodiments, the reservoir body 214 and/or the cover plate 216 may be formed via a casting process (e.g., high pressure die casting).

The cover plate 216 may be relatively flat, may be arcuate (e.g., semi-circular), and may lie substantially normal to the axis 104. Also, the cover plate 216 may define the first axial end 208 of the coolant core 202. The reservoir body 214 may be a generally thin-walled and hollow body with an open side 209 that is covered over by the cover plate 216 and a second side 211 that defines the second axial end 210 of the coolant core 202. The cover plate 216 may be fixed to the reservoir body 214 and sealed thereto with a gasket, seal, etc. One or more fasteners (e.g., bolts or other fasteners may extend axially through the cover plate 216 and the reservoir body 214 for attaching the same. The cover plate 216 and the reservoir body 214 may include one or more fastener holes 270 that receive a bolt or other fastener for attaching the first side electronics to the coolant core 202. Accordingly, the cover plate 216 and the reservoir body 214 may cooperate to define a fluid passage 220 that extends through the coolant core 202. In some embodiments, the fluid passage 220 may be elongate and may extend generally about the axis 104 from the first angular end 231 to the second angular end 232.

The coolant core 202 may also include at least one fluid inlet 222 to the fluid passage 220 and at least one fluid outlet 224 from the fluid passage 220. In some embodiments, for example, there may be a single, solitary inlet 222. The inlet 222 may be disposed proximate the first angular end 231 and may include a round, cylindrical, and hollow connector 223 that projects along the axis 104 from the cover plate 216 away from the first axial end 208. Also, in some embodiments, there may be a single, solitary outlet 224. The outlet 224 may be disposed proximate the second angular end 232 and may include a round, cylindrical, and hollow connector 226 that projects along the axis 104 from the cover plate 216 away from the first axial end 208.

The coolant core 202 may be fluidly connected to a coolant circuit 225, which is illustrated schematically in FIG. 1. The coolant circuit 225 may circulate any suitable fluid, such as a liquid coolant, between the fluid passage 220 and a heat exchanger 203 (FIG. 1). More specifically, coolant may flow from the inlet 222, through the fluid passage 220, to the outlet 224, thereby removing heat from the integrated controller 150, and may continue to flow through the heat exchanger 203 to be cooled before flowing back to the inlet 222 of the coolant core 202, and so on. Furthermore, as shown in FIG. 1, the heat exchanger 203 may, in some embodiments, be separate and fluidly independent of an engine coolant system 207 that cools the engine 125.

As shown in FIG. 4, the second axial end 210 of the coolant core 202 may include one or more inner apertures 240. The inner apertures 240 may include a plurality of pockets, recesses, receptacles, etc. that are open at the second side 211 of the reservoir body 214 and that are disposed proximate the inner radial area 204 of the core 202 in the radial direction. As shown, the inner apertures 240 may be generally cylindrical in some embodiments with circular profiles and with the longitudinal axis thereof arranged parallel to the axis 104. There may be a plurality of inner apertures 240 arranged at different angular positions with respect to the axis 104 along the inner radial area 204 of the core 202. The size and shape of the inner apertures 240 may correspond to certain ones of the internal components 154 of the integrated controller 150. For example, the inner apertures 240 may be cylindrical, as shown, to receive and support inner electronics components, such as a series of capacitors 241 (FIG. 2) of the controller 150. Furthermore, as shown in FIGS. 3 and 4, the reservoir body 214 may define the apertures 240 with relatively thin walls 245 or other structures that separate the capacitors 241 within the apertures 240 from the coolant within the fluid passage 220. Accordingly, the capacitors 241 may be effectively cooled by the coolant circuit 225.

Likewise, as shown in FIG. 4, the second side 211 of the reservoir body 214 may include a second side aperture 246 that has an ovate profile and that is recessed in the axial direction into the reservoir body 214. The second side aperture 246 may be arranged with the major axis of its ovate shape extending tangentially with respect to the axis 104. Also, the minor axis may extend radially and may be large enough to extend over both the inner radial area 204 and the outer radial area 206 of the coolant core 202. Furthermore, the second side aperture 246 may be shaped correspondingly to another electronics component, such as an inverter, capacitor, a battery, or another piece of control equipment.

Additionally, the outer radial area 206 of the coolant core 202 may extend about the axis 104 and may include one or more seats 219. The seats 219 may be rectangular and may lie in a respective tangential plane with respect to the axis 104. The seats 219 may be disposed and spaced apart circumferentially at different angular positions with respect to the axis 104. Furthermore, seats 219 may include a respective outer aperture 250 extending radially therethrough. In some embodiments, at least one outer aperture 250 may be a rectangular hole that is centered within the respective seat 219 and that passes through the reservoir body 214 to the fluid passage 220 therein. The seat 219 may include the rectangular rim of the respective aperture 250.

These outer apertures 250 may be sized and configured to receive an outer electronics component 251 (FIG. 2), such as a substantially-flat and rectangular transistor 253. The transistor 253 may be a circuit component, switch component, MOSFET transistor, or another type. The transistor 253 may be partially received in one of the apertures 250 and may be supported and mounted on a respective seat 219 so as to cover over the respective outer aperture 250. There may be a gasket or other sealing member that seals the transistor 253 to the seat 219. Also, the transistor 253 may include one or more thermally-conductive projections 254 (FIG. 2), such as an array of fins, rails, posts, pins, etc.) that project from an underside thereof to extend into the fluid passage 220. Accordingly, coolant within the coolant circuit 225 may flow across the projections 254 to provide highly effective cooling to the transistor 253.

As shown in FIG. 2, the integrated controller 150 may include a fastener arrangement 275 used for attaching at least one of the transistors 253 to the coolant core 202. The fastener arrangement 275 may include at least one resilient clip 276. The fastener arrangement 275 may also include fasteners 277 used to attach respective clips 276 to the coolant core 202. Also, in some embodiments, the fastener arrangement 275 may include a plurality of clips 276 and fasteners 277 for retaining a plurality of the transistors 253 on the core 202 (e.g., on the outer radial area 206 of the core 202).

Figure 5:
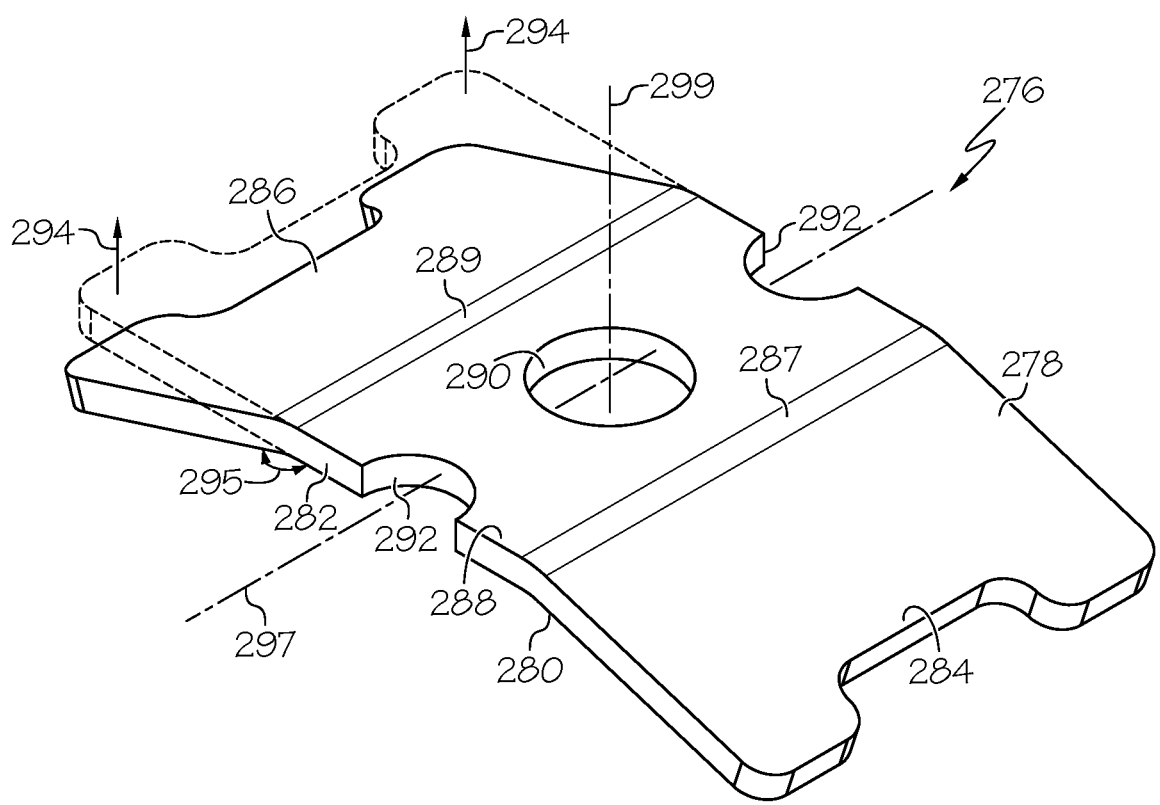
FIG. 5 is an isometric view of a retainer clip of the integrated controller of FIG. 2 according to example embodiments of the present disclosure.

As shown in FIG. 5, the resilient clip 276 may be a relatively thin piece of flexible material, such as metal. The clip 276 may have an outer surface 278, an inner surface 280, and an outer edge 282. The outer edge 282 may include four sides and may be generally rectangular with rounded corners. The clip 276 may be a unitary, one-piece part that has substantially constant thickness, which is measured between the inner surface 280 and the outer surface 278. Furthermore, the clip 276 may be non-planar, and the clip 276 may have a first end 284, a second end 286, and an intermediate portion 288 that are each substantially flat and lie in different planes. The intermediate portion 288 may be disposed between the first and second ends 284, 286. The first end 284 may be flat and planar with a first bend 287 between the intermediate portion 288 and the first end 284. The second end 286 may be flat and planar with a second bend 289 between the intermediate portion 288 and the second end 286. The second bend 289 may extend along a linear axis 297 (which may be parallel to the axis 104 of FIG. 2). The second end 286 may be disposed at an obtuse angle 295 measured about the axis 297 relative to the intermediate portion 288. The first end 284 may be disposed at a substantially equal and opposite angle relative to the intermediate portion 288.

The intermediate portion 288 may include a central hole 290 extending along an axis 299 through the clip 276 in the thickness direction. (The axis 299 extend radially and may intersect the axis 104 of FIG. 2.) The outer edge 282 may also include side apertures 292, such as semi-circular notches included in the intermediate portion 288.

The clip 276 may be resiliently flexible and may resiliently move between a neutral position and a flexed position. The neutral position is represented in solid lines in FIG. 5, and the second end 286 is shown resiliently flexed in broken lines in FIG. 5. As shown, flexure may cause the second end 286 to displace, for example, rotate about the axis 297 as represented by arrows 294. It will be appreciated that the first end 284 may resiliently flex in a similar fashion but in an opposite direction about the axis 297.

The coolant core 202 may include features of the fastener arrangement 275 as well. As shown in FIGS. 3 and 4, the coolant core 202 may include mounts 264 for the retainer clips 276. The mounts 264 may be flat areas on the outer radial area 206 that project outward radially. The mounts 264 may include a clip mounting hole 296 that may be threaded. Also, the mounts 264 may include one or more (e.g., a pair) of posts 266 or other small radial projections. The posts 266 may be disposed on opposite axial sides of the respective hole 296.

The fastener arrangement 275 may further include the plurality of fasteners 277. The fasteners 277 may include threaded bolts in some embodiments, which are configured to be received within respective ones of the holes 296.

The fastener arrangement 275 may be used to conveniently and efficiently install the transistors 253 to the coolant core 202. For example, as shown in FIG. 2, the transistors 253 may be seated on the respective seats 219 of the coolant core 202. Then, the clips 276 may be positioned on respective mounts 264 of the core 202. The posts 266 may be received within the side apertures 292 of the clips 276. Next, the clips 276 may be removably attached to the coolant core 202 with respective ones of the fasteners 277. The fasteners 277 may be advanced along the axis 299 into the central hole 290 of the respective clip 276 and threadably attached within threaded clip mounting holes 296 of the coolant core 202.

As the fastener 277 advances along the axis 299, the engagement between the posts 266 and the clip 276 may hold the clip 276 and limit its rotation about the axis 299.

Also, as the fastener 277 advances into the core 202, the fastener 277 may apply a retaining load to the clip 276 against the outer core 202.

This attachment of the clips 276 may cause the clips 276 to resiliently flex. More specifically, the first end 284 and/or the second end 286 of the clips 276 may be cantilevered with respect to the attachment of the intermediate portion 288 and the core 202. The ends 284, 286 of the clip 276 may overlap and abut one side of a neighboring transistor 253 as shown in FIG. 2. In other words, the transistor 253 may be disposed radially between the seat 219 of the core 202 and the end 284, 286 of the clip 276. Thus, as the fastener 277 advances into the hole 296, the transistor 253 may push the end 284, 286 outward radially, thereby resiliently flexing the clip 276. Once the fastener 277 is fully installed, the clip 276 may remain in the flexed position, providing a spring biasing force that retains the transistor 253 against the seat 219.

It will be appreciated that features of the clip 276 may be chosen for controlling the spring biasing force provided by the clip 276. For example, the thickness of the clip 276, the angle 295, the material of the clip 276, and/or other features may be chosen such that the clip 276 provides a desired amount of biasing force. The clip 276 may be selected to provide a load high enough to robustly retain the transistor 253 but low enough to avoid fracture or other damage to the transistor 253.

Furthermore, it will be appreciated that the clip 276 may distribute retaining loads across a relatively large area of the transistor 253. For example, the clip 276 may abut and overlap the transistor 253 at planar interfaces that distribute loads more evenly. Also, these planar interfaces may be conveniently controlled for proper fitting.

The fastener arrangement 275 may be configured differently without departing from the scope of the present disclosure. For example, the clips 276 may be attached to the core 202 using fasteners 277 other than bolts. In additional embodiments, the clips 276 may be staked (at a stake), welded (at a weldment), adhesively attached (at a bond), etc. for attachment to the core 202. Like the embodiments discussed above, attaching the clips 276 to the core 202 may cause the ends 284, 286 to resiliently flex and hold the transistor 253 to the core 202. In additional embodiments, the anti-rotation engagement of the posts 266 and side apertures 292 may be reversed from the illustrated embodiment, wherein the clip 276 includes a male projection and the core 202 includes a female aperture that receives the projection.

Thus, the transistors 253 may be installed compactly and conveniently about the axis 104. They may be retained securely against the core 202 for effective cooling. Also, the fastener arrangement 275 may include relatively few parts with at least some clips 276 retaining two (or more) transistors 253 at once.

Referring now to FIG. 2, additional features of the core 202 will be discussed. The first axial end 208 defined substantially by the cover plate 216 may provide one or more surfaces for mounting and supporting a first side electronics package 260. The first side electronics package 260 is represented schematically in FIG. 2 as a semi-circular body that corresponds generally to the shape of the coolant core 202, and it will be appreciated that the first side electronics package 260 may comprise a plurality of electronics components, such as one or more conductive bus bars, circuit board assemblies, etc. There may also be support structures, such as brackets, plates, etc. for supporting the electronics package 260. Furthermore, there may be a number of fasteners for attaching the first side electronics package 260 to the first axial end 208 of the coolant core 202. The first side electronics package 260 may be layered on the first axial end 208 such that both extend arcuately about the axis 104. The first side electronics package 260 may be attached to the first axial end 208 in any suitable fashion, such as fasteners. Accordingly, the first side electronics package 260 may be in close proximity with at least one surface of the package 260 layered on and abutting an opposing surface of the coolant core 202 such that the coolant core 202 may absorb heat therefrom with high efficiency and effectiveness.

Likewise, the second axial end 210 of the coolant core 202 may provide one or more surfaces for mounting and supporting a second side electronics package 262. Like the first side electronics package 262, the second side electronics package 262 is represented schematically, however, it will be appreciated that the package 262 may include a number of electronic and/or mechanically supportive/fastening parts. The second side electronics package 262 may be arcuate and may extend partly about the axis 104. The second side electronics package 262 may be layered on the second axial end 210 such that both extend arcuately about the axis 104. The second side electronics package 262 may be attached to the second axial end 210 in any suitable fashion, such as fasteners. Moreover, the second side electronics package 262 may be in close proximity to the coolant core 202 with at least one surface of the package 262 layered on and abutting an opposing surface of the coolant core 202 for efficient and effective cooling.

The fluid passage 220 for the coolant within the coolant core 202 may be defined between the inner surfaces of the reservoir body 214, the inner face of the cover plate 216, and the inner faces of the transistors 253. The fluid passage 220 may also extend arcuately about the axis 104, from the inlet 222 to the outlet 224. Coolant may enter via the inlet 222, flow generally from the first angular end 231 to the second angular end 232 and exit via the outlet 224. Accordingly, the coolant may flow in close proximity and across the core-facing surfaces of the transistors 253, the capacitors 241, the first side electronics package 260, and the second side electronics package 262.

Accordingly, in some embodiments, the coolant core 202 may be substantially surrounded by heat-producing electronics components. The coolant core 202 may be thermally coupled to these components due to the close proximity and, in some areas, due to abutting contact therebetween. Some interfaces (e.g., at the projections 254) may provide direct fluid contact with the coolant. As shown in FIG. 2, the coolant core 202 may be thermally coupled to the electronics components on the inner radial area 204, the outer radial area 206, the first axial end 208 and the second axial end 210. The fluid passage 220 may be defined radially between the inner radial area 204 and the outer radial area 206 to receive heat from both the inner electronics components (e.g., the capacitors 241) and the outer electronics components 251 (e.g., the transistors 253). Moreover, the fluid passage 220 may be defined axially between the first and second axial ends 208, 210 to receive heat from both the first and second side electronics packages 260, 262.

Furthermore, the controller 150 may be integrated and packaged among the turbine section, the motor 116, and/or the compressor section, any of which may operate at elevated temperatures. The coolant core 202 and the coolant circuit 225 may provide cooling to these surrounding components as well. Thus, it will be appreciated that the controller 150 may be packaged compactly and that there may be several features that generate heat during operation;

however, the coolant core 202, the coolant circuit 225, and other features discussed above may provide effective and efficient cooling.

Moreover, the controller 150 may be robustly supported on the turbocharger 100. The coolant core 202 may provide mechanical support while also providing compact packaging for the controller 150. Also, the part count may be relatively low and the controller 150 may be manufactured and assembled in an efficient manner.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A fluid compressor device comprising:
   a housing;
   a rotating group supported for rotation within the housing about an axis, the rotating group including a compressor wheel;
   an e-machine that is operably coupled to the rotating group and configured as at least one of a motor and a generator; and
   an integrated controller of the e-machine and supported by the housing, the integrated controller having an arcuate support structure that extends about the axis, the arcuate support structure having a radial area that faces radially relative to the axis, the radial area including a first seat and a second seat, the second seat spaced apart circumferentially from the first seat, the integrated controller having a first electronics component supported on the first seat and a second electronics component supported on the second seat, the integrated controller including a retainer clip that is unitary and resiliently flexible between a neutral position and a flexed position, the retainer clip fixed to the support structure and in the flexed position to retain the first electronics component on the first seat and the second electronics component on the second seat;
   the retainer clip being fixed to the support structure and in the flexed position to bias the first electronics component radially toward the first seat to retain the first electronics component on the first seat and to bias the second electronics component radially toward the second seat to retain the second electronics component on the second seat.

2. The fluid compressor device of claim 1, wherein the retainer clip includes a first end, a second end, and an intermediate portion that is disposed between the first end and the second end; and
   wherein the intermediate portion is fixed to the support structure, the first electronics component is retained and disposed radially between the support structure and the first end, and the second electronics component is retained and disposed radially between the support structure and the second end.

3. The fluid compressor device of claim 2, wherein the intermediate portion is removably fixed to the support structure.

4. The fluid compressor device of claim 3, further comprising a threaded fastener that extends through the intermediate portion and that threadably attaches to the support structure to removably fix the intermediate portion to the support structure.

5. The fluid compressor device of claim 2, wherein one of the support structure and the intermediate portion includes a projection and the other of the support structure and the intermediate portion includes an aperture that receives the projection.

6. The fluid compressor device of claim 2, wherein the first end overlaps and abuts the first electronics component at a first planar interface, and wherein the second end overlaps and abuts the second electronics component at a second planar interface.

7. The fluid compressor device of claim 1, wherein the retainer clip includes a cantilevered end extending away from an attachment of the retainer clip to the support structure, the cantilevered end resiliently retaining the first electronics component between the cantilevered end and the support structure.

8. The fluid compressor device of claim 1, wherein the radial area is an outer radial area of the arcuate support structure that faces radially away from the axis.

9. The fluid compressor device of claim 1, wherein the support structure includes an internal coolant fluid passage that receives a coolant flow for receiving heat from the electronics component.

10. A method of manufacturing a fluid compressor device comprising:
    supporting a rotating group within a housing about an axis, the rotating group including a compressor wheel;
    operably coupling an e-machine to the rotating group, the e-machine configured as at least one of a motor and a generator;
    supporting an integrated controller of the e-machine on the housing, including extending an arcuate support structure about the axis, the arcuate support structure having a radial area that faces radially relative to the axis, the radial area including a first seat and a second seat, the second seat spaced apart circumferentially from the first seat; and
    retaining a first electronics component on the first seat and a second electronics component on the second seat with a retainer clip that is unitary and resiliently flexible between a neutral position and a flexed position, including fixing the retainer clip to the support structure with the retainer clip in the flexed position to bias the first electronics component radially toward the first seat to retain the first electronics component on the first seat and to bias the second electronics component radially toward the second seat to retain the second electronics component on the second seat.

11. The method of claim 10, wherein the retainer clip includes a first end, a second end, and an intermediate portion that is disposed between the first end and the second end; and
    wherein retaining the first electronics component on the first seat and the second electronics component on the second seat includes fixing the intermediate portion to the support structure, resiliently flexing the first end against the first electronics component, and resiliently flexing the second end against the second electronics component.

12. The method of claim 11, wherein fixing the intermediate portion to the support structure includes removably attaching the intermediate portion to the support structure.

13. The method of claim 11, further comprising receiving a projection of one of the support structure and the intermediate portion within an aperture of the other of the support structure and the intermediate portion.

14. The method of claim 11, further comprising overlapping and abutting the first end on the first electronics component at a first planar interface, and further comprising overlapping and abutting the second end on the second electronics component at a second planar interface.

15. The method of claim 10, wherein the radial area is an outer radial area of the arcuate support structure that faces radially away from the axis.

16. The method of claim 10, further comprising providing a coolant to an internal coolant fluid passage of the support structure for receiving heat from the electronics component.

17. A turbocharger comprising:
- a housing;
- a rotating group supported for rotation within the housing about an axis, the rotating group including a compressor wheel and a turbine wheel;
- an electric motor that is operably coupled to the rotating group to drive rotation of the rotating group about the axis;
- an integrated controller of the electric motor and supported by the housing, the integrated controller having an arcuate coolant core that extends about the axis, the coolant core having an outer radial area that faces radially away from the axis and that includes a first seat and a second seat that are spaced apart circumferentially, the first seat and the second seat facing outward radially from the axis, the integrated controller having a first electronics component a second electronics component, the integrated controller including a resiliently flexible that is unitary, the retainer clip having a first end, a second end, and an intermediate portion that is disposed between the first end and the second end, the intermediate portion fixed to the coolant core, the first electronics component being retained and disposed radially between the coolant core and the first end with the first end resiliently flexed, and the second electronics component being retained and disposed radially between the coolant core and the second end with the second end resiliently flexed;
- the retainer clip being fixed to the support structure and in the flexed position to bias the first electronics component radially toward the first seat to retain the first electronics component on the first seat and to bias the second electronics component radially toward the second seat to retain the second electronics component on the second seat.

18. The turbocharger of claim 17, wherein the first end overlaps and abuts the first electronics component at a first planar interface, and wherein the second end overlaps and abuts the second electronics component at a second planar interface.

* * * * *